United States Patent [19]

Debus et al.

[11] 4,329,975
[45] May 18, 1982

[54] SOLID FUEL STOVE UTILIZABLE AS A FIREPLACE

[75] Inventors: Gerhard Debus, Steffenberg; Erwin Hof; Günter Herrmann, both of Herborn, all of Fed. Rep. of Germany

[73] Assignee: Buderus Aktiengesellschaft, Wetzlar, Fed. Rep. of Germany

[21] Appl. No.: 178,308

[22] Filed: Aug. 15, 1980

[30] Foreign Application Priority Data

Aug. 17, 1979 [DE] Fed. Rep. of Germany ... 7923525[U]

[51] Int. Cl.³ .............................................. F23M 7/00
[52] U.S. Cl. ..................................... 126/192; 126/62; 126/4
[58] Field of Search ................. 126/190, 192, 197, 62, 126/126, 146, 202, 299 R, 299 D, 303, 4; 110/173 R

[56] References Cited

U.S. PATENT DOCUMENTS

| 582,049 | 5/1897 | Finch | 126/126 |
| 754,035 | 5/1904 | Albrecht | 126/192 |

FOREIGN PATENT DOCUMENTS

| 74321 | 12/1944 | Czechoslovakia | 126/197 |
| 8711 | of 1898 | United Kingdom | 126/62 |

Primary Examiner—Samuel Scott
Attorney, Agent, or Firm—Karl F. Ross

[57] ABSTRACT

A so-called stack stove, especially for the burning of solid fuels and particularly wood has a hood or apron extending downwardly and outwardly along the upper portion of at least its front above the opening into the combustion chamber. A window door is mounted so as to be shiftable upwardly into the hood and locked therein so that it is substantially completely concealed by the hood when the stove is operated in a fireplace mode. In its lower position the door closes the chamber opening and the stove can function as a sealed stove with limited air entry for efficient combustion.

3 Claims, 4 Drawing Figures

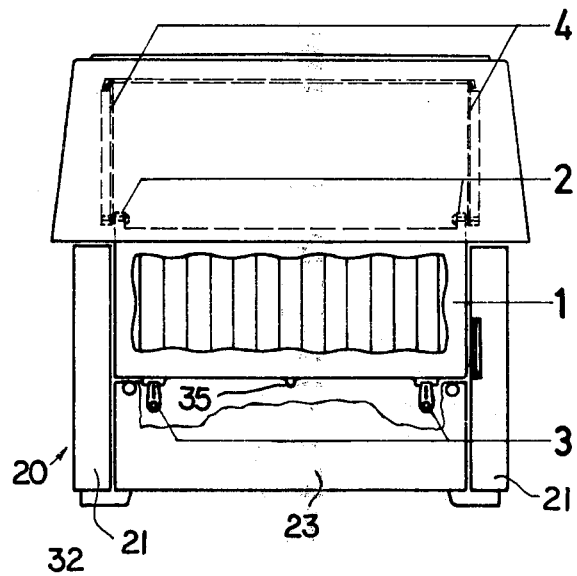
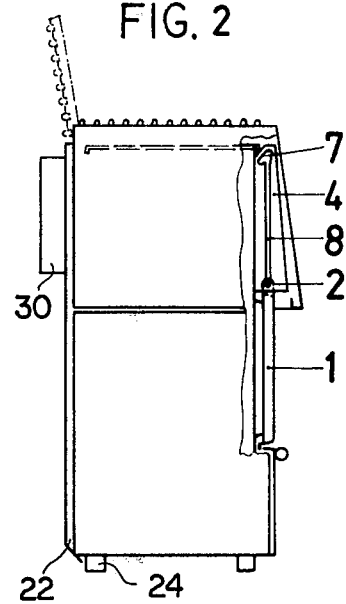
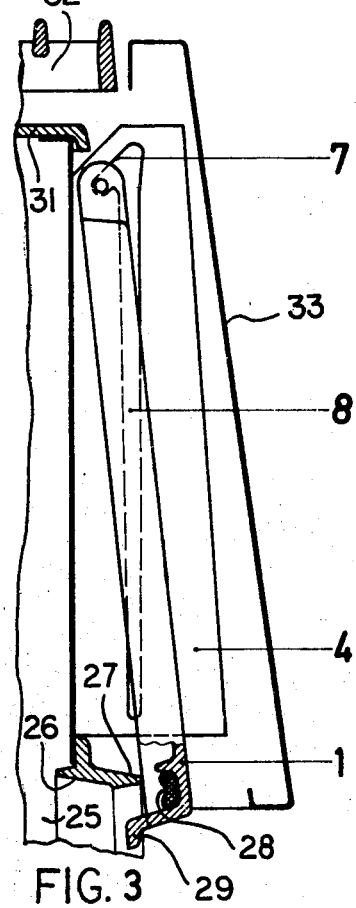
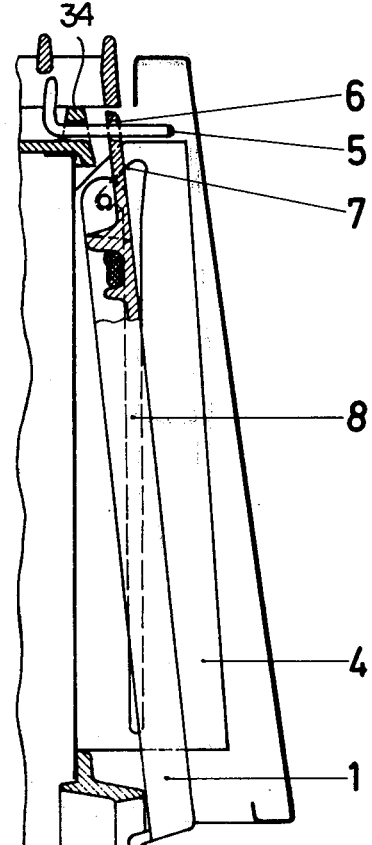

SOLID FUEL STOVE UTILIZABLE AS A FIREPLACE

FIELD OF THE INVENTION

Our present invention relates to a so-called stack stove and, more particularly, to a heating stove which has a door having a closed position for efficient fuel burning and an open position in which the stove can function as a fireplace or like heating unit.

BACKGROUND OF THE INVENTION

With increasing concern as to the availability of oil and gas as home-heating media, there has been considerable development of improved solid-fuel stoves or furnaces which can be utilized as space heaters, i.e. disposed in a room, fueled through an open door and serving to heat this room and connecting spaces.

In fact, wood-burning stoves of this type are already available in a wide variety of shapes and sizes, have doors which can be sealed to prevent uncontrolled entry of air, and are provided with means enabling them to be utilized not only for space heating but for cooling and stove-top heating requirements.

It has already been proposed to make such stoves so that the door can be swung out of the way, thereby exposing the combustion-chamber opening and enabling the unit to act as a fireplace for the open burning of the fuel.

It has also been proposed to provide such stoves with a downwardly and outwardly inclined apron or hood, at least at the front of the stove, resembling the aprons or hoods which are used for smoke catchers on built-in fireplace and the like.

With stack stoves of this type, the hood, which can be merely decorative but also can be utilized as an air guide to increase convective displacement of air to be heated by the stove or even in part as a smoke catcher in a fireplace mode of operation, is upwardly swingable so that the door, hinged at its upper portion, can also be swung upwardly when operation of the heating unit with the open chamber is desired.

This, of course, causes interference with any heating at the top of the stove.

OBJECTS OF THE INVENTION

It is the principal object of the present invention, therefore, to provide a stack stove which is esthetically pleasing in all operative modes, is readily convertible from a sealed-door to an open-chamber mode, and enables a heating surface at the top of the stove to be utilized in all operating modes.

Another object of the invention is to provide an improved solid-fuel stove which is free from the disadvantages of earlier systems and is of improved versatility.

SUMMARY OF THE INVENTION

These objects and others which will become apparent hereinafter are attained, in accordance with the present invention, in a stack stove, having a hood in the manner described and in which means is provided for guiding and retaining the window door in and beneath the hood. The door can thus be fully removed from sight without requiring movement or modification of the hood for operation of the stove in the open-chamber mode and without requiring displacement, removal or obstruction of the upper or cover plate which can be utilized for heating purposes, e.g. cooking.

According to the present invention, within the hood and at opposite vertical sides of the window door there are provided guides with upwardly extending slots into which the pintles or pins at the upper edge of the door are received so that the door, upon being unlatched, can be slid upwardly until these pins reach the tops of the grooves or slots.

The groove at each upper end may have a downwardly extending portion forming a rest into which the pins can be latched or retained to hold the door in its upper position.

BRIEF DESCRIPTION OF THE DRAWING

The above and other objects, features and advantages of the present invention will become more readily apparent from the following description, reference being made to the accompanying drawing in which:

FIG. 1 is a front elevational view of a stove embodying the invention;

FIG. 2 is a side elevational view thereof showing the door in its closed position;

FIG. 3 is a cross section with the door raised over a portion of the stove drawn to a larger scale; and FIG. 4 is a view similar to FIG. 3 illustrating another embodiment.

SPECIFIC DESCRIPTION

In FIG. 1 of the drawing we have shown a solid-fuel stove 20 which may have lateral walls 21, a rear wall 22 and a front wall 23 composed of sheet steel or cast iron, and mounted upon a plurality of feet 24. The interior of the stove receives a grate, not shown, above which is formed a combustion chamber 25 to which access is afforded by a rectangular opening 26 formed by a forwardly projecting lip 27 sealingly engaging a refractory gasket 28 formed in the rim 29 of a window door 1 which can be glazed so that, even when the door is closed, the progress of the fire within the chamber can be observed.

The ash box, if any, vents for permitting controlled access of air to the combustion zone and like elements of the stove have not been illustrated since they do not relate to the present invention.

The front wall 23 carries a pair of latches or dogs 3 which can lock the door 1 in its lower position.

The rear wall 22 is provided with an outlet flange 30 which is connected to a chimney via the usual damper and the top of the stove is provided with a heating plate 31 overlain by a grate or grill 32 which can be swung upwardly when the smooth surface of plate 31 is utilized (see broken line position in FIG. 2). The grate 32 can be used to support cooking utensils if desired.

As will be apparent from the drawing as well, the vertical sides of the window door 1 are provided with hinge blocks 2 with pins which reach into the slots 8 of a pair of guides 4 flanking the door within a downwardly and forwardly inclined hood 33 which opens just above the top of the flange 26.

After releasing the latches or dogs 3, the door 1 can be swung forwardly slightly (see FIG. 3) and then slid upwardly along the slots 8 until the pins reach the top of the slots 8 and fall rearwardly into a short inclined slot 7 at each upper end of a slot 8 of the respective guide 4. The door is thus held in its upper position.

In this position, the door is fully concealed within the hood.

In the embodiment of FIG. 4, in addition to the inclined rest 7, the door can be provided with lugs 6 having holes engaged by pins 5 guided in lugs 34 of the top plate 31 and releasable upon upwardly tilting of the grate 32 when the door is to be closed.

Upon release of these pins, the door may be raised slightly, e.g. with a so-called "cold-hand" (a removable handle) engaging the projection 35 on the door, and then lowered along the slots 8 into the closed position.

We claim:

1. A solid fuel stove comprising:

wall means defining a combustion chamber and including a front wall formed with an opening through which a fire in said chamber can be viewed and fuel added to said fire and a top wall forming a cooking surface for items can be heated by the fire in said chamber;

a hood projecting forwardly from said front wall and disposed above said opening;

a pair of lateral guides within said hood at opposite sides of said opening, each of said guides being formed with a longitudinally extending slot communicating with a rest at the top of each guide; and a door dimensioned to cover said opening and disposed forwardly of said front wall, said door having at its top a pair of laterally extending pins projecting from opposite edges of said door into respective one of said slots whereby said slots guide said door upwardly into said hood for concealment by said hood, said pins engaging said rests in an upper concealed position of said door for releasably retaining said door substantially completely within said hood, thereby maintaining said cooking surface free to receive said articles.

2. The stove defined in claim 1, further comprising bolts mounted on said top wall and engageable in holes formed in an upper edge of said door when said door is in an upper position concealed within said hood.

3. The stove defined in claim 2 wherein said door is formed with a gasket and said opening is surrounded by a forwardly projecting flange engaging said gasket in a lower position of said door.

* * * * *